United States Patent [19]
McMaster

[11] Patent Number: 5,403,369
[45] Date of Patent: Apr. 4, 1995

[54] APPARATUS AND METHOD FOR POSITIONING GLASS SHEETS

[75] Inventor: Ronald A. McMaster, Perrysburg, Ohio

[73] Assignee: Glasstech, Inc., Perrysburg, Ohio

[21] Appl. No.: 120,687

[22] Filed: Sep. 13, 1993

[51] Int. Cl.⁶ ............................................. C03B 23/035
[52] U.S. Cl. ................................. 65/25.4; 65/106; 65/182.2; 65/273; 65/289
[58] Field of Search ....................... 65/25.4, 106, 182.2, 65/273, 289

[56] References Cited

U.S. PATENT DOCUMENTS

| | | | |
|---|---|---|---|
| 4,204,853 | 5/1980 | Seymour | 65/106 |
| 4,386,952 | 6/1983 | Nitschke | 65/106 |
| 4,802,904 | 2/1989 | Boutier et al. | 65/106 |
| 5,009,695 | 4/1991 | Kuster et al. | 65/182.2 |
| 5,066,321 | 11/1991 | Kramer et al. | 65/182.2 |
| 5,096,478 | 3/1992 | Kramer et al. | 65/289 |

Primary Examiner—Joye L. Woodard
Attorney, Agent, or Firm—Brooks & Kushman

[57] ABSTRACT

Apparatus (10) for positioning a heated glass sheet G includes a longitudinally extending air flotation conveyor (12) for receiving and floating the heated glass sheet, a glass sheet vacuum mold (14) movably mounted above the air floatation conveyor for receiving the heated glass sheet, a glass sheet positioner (16) mounted relative to the mold for peripherally engaging and laterally and longitudinally positioning the glass sheet with respect to the mold and an array of lift jets (18) interspersed amongst the air flotation conveyor and located beneath the mold for lifting the glass sheet onto the vacuum mold through the application of lifting air on the bottom surface of the glass sheet. A glass sheet processing ring (26) transversely movable relative to the air flotation conveyor (12) subsequently receives the glass sheet from the mold (14). A method for positioning the heated glass sheet includes the steps of conveying the glass sheet on a cushion of air, peripherally engaging the floating glass sheet, locating the engaged floating glass sheet beneath a vacuum mold, applying jets of lifting air to lift the floating glass sheet upwardly to the vacuum mold, and applying vacuum to engage the positioned glass sheet on the vacuum mold.

12 Claims, 3 Drawing Sheets

APPARATUS AND METHOD FOR POSITIONING GLASS SHEETS

TECHNICAL FIELD

This invention relates to apparatus and a method for positioning a glass sheet in a side exit glass sheet forming system including an air float conveyor.

BACKGROUND ART

In a conventional glass sheet processing system referred to as a side exit glass sheet forming system, a heated glass sheet is conveyed in a longitudinal direction of conveyance along a roller conveyor comprised of a plurality of conveyor rolls. The positioning is performed upstream or at a forming station on the roller conveyor that transports the glass sheet. A male vacuum mold, at an elevation above the conveyor rolls, is movable vertically with respect to the roller conveyor to receive the heated glass sheet. The heated glass sheet is picked up as the vacuum mold descends over the positioned glass sheet on the roller conveyor, lift jets are activated to lift the glass sheet up to the vacuum mold and a vacuum force is actuated. The mold is then elevated with the glass sheet attached to the mold by the vacuum action. A glass sheet processing ring is subsequently positioned below the vacuum mold and glass sheet. The glass sheet processing ring may be a press ring, quench ring or combination press-quench ring.

As the glass sheet is positioned on the roller conveyor, there is the occasional surface damage to the glass sheet which occurs when the glass sheet is slid on the conveyor rolls. Also, the positioning of the glass upstream of the forming section does not lend itself to the glass sheet positioning accuracy required in today's tight tolerance glass sheet applications.

DISCLOSURE OF THE INVENTION

An object of the present invention is to provide improved apparatus for positioning glass sheets for forming in a side exit glass sheet forming system.

Another object of the present invention is to provide apparatus for positioning glass sheets in a side exit glass sheet forming system that utilizes an air flotation conveyor to eliminate damage to the glass sheets during the positioning action.

Another object of the present invention is to provide an improved method for positioning glass sheets in a side exit glass sheet forming system that lends itself to accurate lateral and longitudinal positioning of the glass sheets.

In carrying out the above objects and other objects of the invention, apparatus for positioning and forming heated glass sheets in a side exit glass sheet forming system includes a longitudinally extending air floatation conveyor for receiving and floating a heated glass sheet in a plane of conveyance provided by a cushion of air. A glass sheet vacuum mold is vertically movably mounted above the air floatation conveyor for receiving the heated glass sheet. A glass sheet positioner mounted relative to the vacuum mold is laterally and longitudinally movable for engaging and laterally and longitudinally positioning the glass sheet with respect to the mold. An array of lift jets located beneath the mold and below the plane of conveyance and interspersed amongst the air floatation conveyor is operable for lifting the glass sheet up to the vacuum mold through the application of lifting air on the lower surface of the glass sheet.

A method for positioning a heated glass sheet in the above glass sheet forming system includes the steps of conveying the glass sheet on a cushion of air, peripherally engaging the floating glass, locating the engaged floating glass sheet beneath the vacuum mold, applying jets of lifting air to lift the floating glass sheet upwardly to the vacuum mold, and applying vacuum to engage the positioned glass sheet on the vacuum mold.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
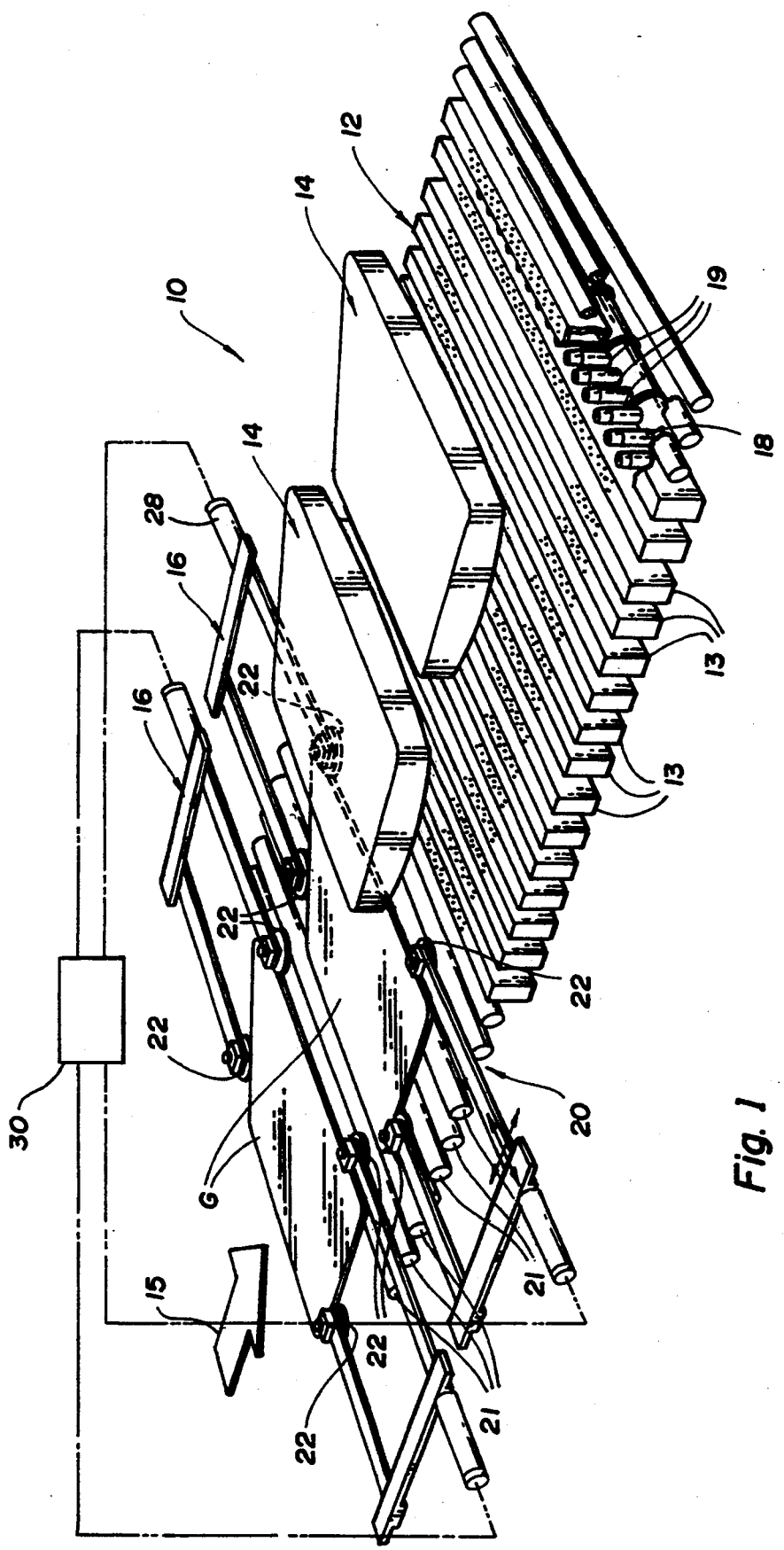
FIG. 1 is a perspective view of a forming section of a side exit glass sheet forming system including an air flotation conveyor, glass sheet vacuum molds and a lift jet array constructed in accordance with the present invention illustrating a first position of a positioning apparatus for capturing conveyed glass sheets as they transfer from a roller conveyor to the air flotation conveyor.
Figure 3:
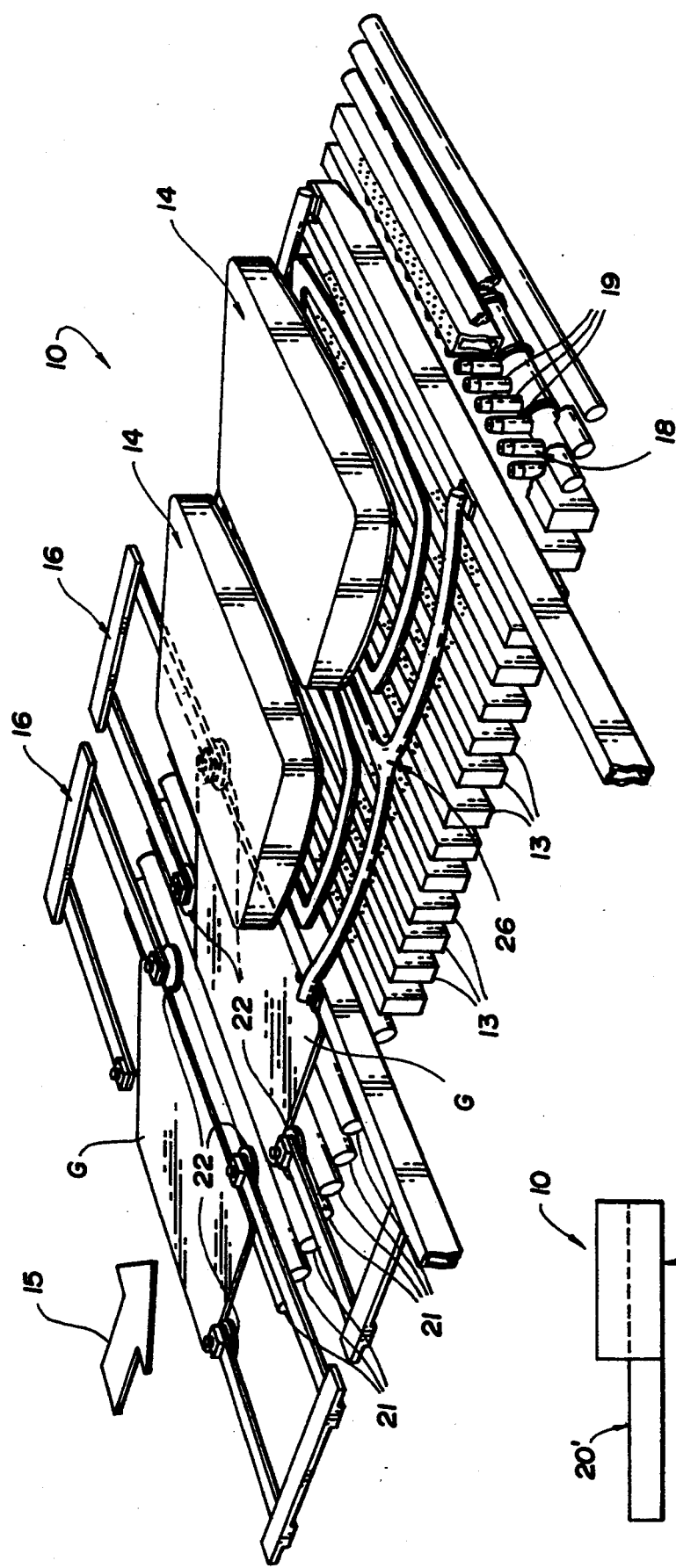
FIG. 3 is a perspective view of the forming section of FIG. 1 illustrating a third position of the positioning apparatus wherein a press-quench ring has moved beneath the vacuum molds.

Referring to FIGS. 1 and 3 of the drawings, apparatus for positioning glass sheets constructed in accordance with the present invention is generally indicated by reference numeral 10 and defines in part the forming section of a side exit glass sheet forming system. As is hereinafter more fully described, apparatus 10 is used to catch a heated glass sheet G, facilitate the transfer and receipt of the heated glass sheet and accurately position it for subsequent forming. Apparatus 10 eliminates the damage caused to glass sheets during positioning on roller conveyors prior to pickup.

As shown in FIG. 1 of the drawings, apparatus 10 includes a longitudinally extending air flotation conveyor 12 comprised of a plurality of transversely extending air supply tubes 13 for receiving and floating a heated glass sheet G in a plane of conveyance on a cushion of air. The air supply tubes 13 extend laterally with respect to the longitudinal direction of conveyance and are spaced from each other, and have upper openings through which pressurized air is supplied to provide the gas cushion on which the glass sheet floats. A glass sheet vacuum mold 14 illustrated as a forming mold is vertically movably mounted above the air floatation conveyor 12 for receiving the heated glass sheet G from an upstream location. The direction of glass sheet conveyance is indicated by arrow 15. A glass sheet positioner 16 mounted relative to the mold 14 is laterally and longitudinally movable for engaging and laterally and longitudinally positioning the glass sheet G with respect to the mold. A conventional actuator 28 is connected to each positioner 16 to move the positioner longitudinally (i.e., in the direction of conveyance of the glass sheet) as well as laterally (i.e., transverse to the direction of conveyance of the glass sheet). It should be noted that each positioner 16 can be independently operated to provide rotational adjustments of the glass sheet. A controller 30 is operable for independently controlling the operation of the actuators 28.

An array of lift jets 18 is located beneath the mold 14 and below the plane of conveyance. The array of lift jets 18 includes nozzles 19 that are interspersed amongst the air flotation conveyor 12 between its air supply tubes 13. Pressurized air is supplied through nozzles 19 to lift the glass sheet G to the mold through the application of lifting air to the bottom surface of the glass sheet.

Although reference hereinafter may be made to singular structural elements, it can be appreciated that such reference is applicable to both singular or multiple, similar, structures illustrated and that similar reference characters refer to similar structural elements.

Figure 4:
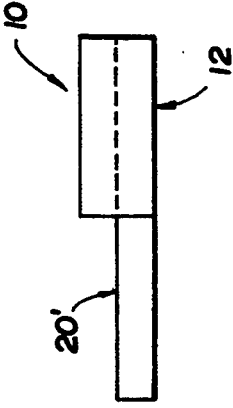
FIG. 4 is a schematic view that illustrates an alternate embodiment wherein an air float conveyor conveys the glass sheet for heating.

With continued reference to FIG. 1, a roller conveyor 20 defined by a plurality of conveyor rolls 21 is mounted adjacent and upstream of the air floatation conveyor 12. Roller conveyor 20 transports and imparts movement to the heated glass sheet G. Such roller conveyors 20 are well known in the art. Alternatively, as shown in FIG. 4, an air float conveyor 20' can be utilized for supporting and or transporting the heated glass sheet G upstream of the air flotation conveyor 12. Both the roller conveyor 20 (or air float conveyor 20') and air flotation conveyor 12 are located in a glass sheet furnace (not shown). Positioners 16 include glass sheet engagement members 22 which are operable to engage the periphery of the glass sheet G. Such positioners are described in U.S. Pat. No. 5,066,321 owned by the assignee of the application herein. Engagement members 22 of glass sheet positioner 16 engage the periphery of glass sheet G upstream of the forming mold 14, as illustrated, and are operable to travel downstream transporting the glass sheet and positioning the glass sheet beneath the mold 14, as shown in FIG. 2.

Figure 2:
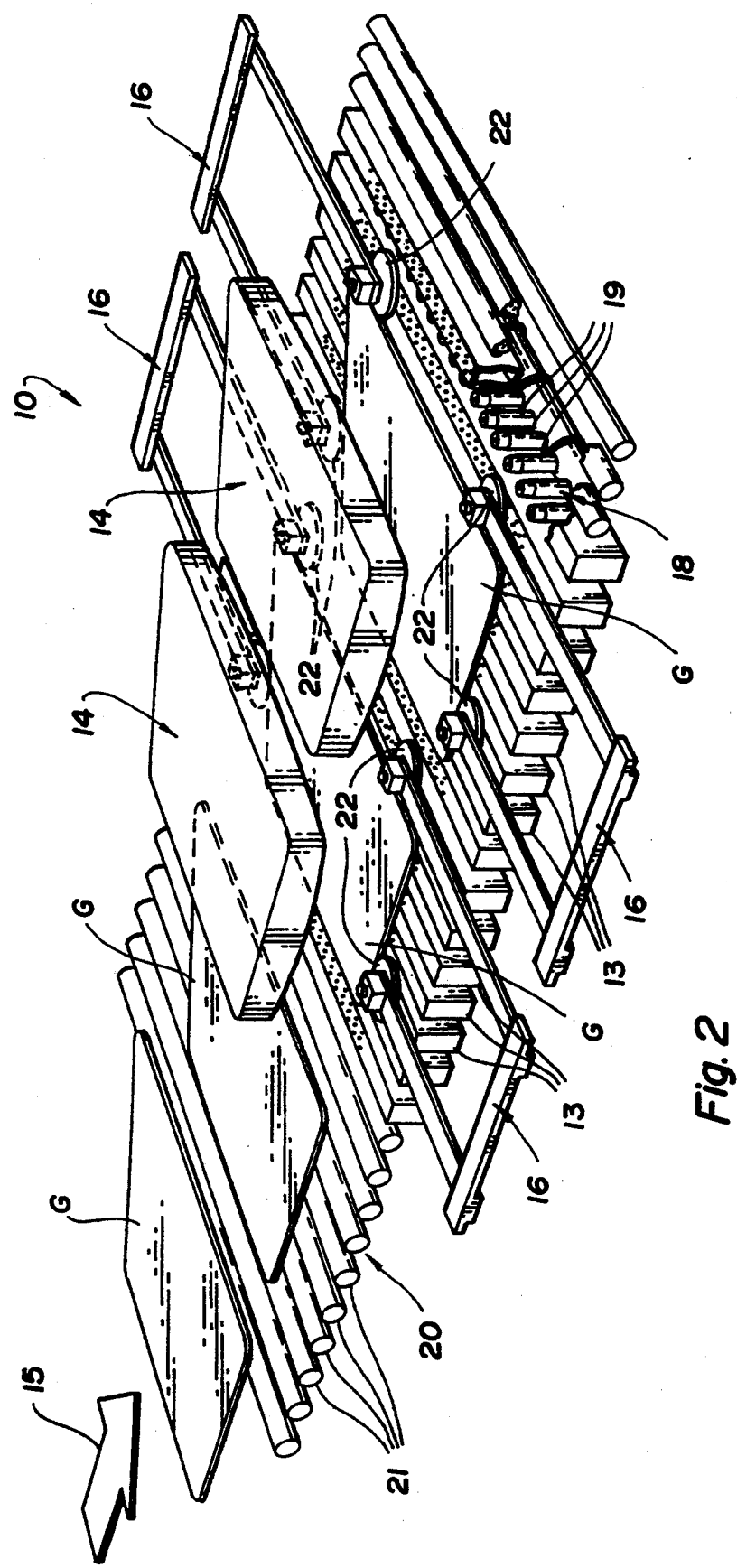
FIG. 2 is a perspective view of the forming section of FIG. 1 illustrating a second position of the positioning apparatus positioning the glass sheets floated on the air float bed beneath the vacuum molds.

In FIG. 2, glass sheet G has been positioned beneath mold 14. Mold 14 is lowered and lifting air is applied by the lift jets 18 to the bottom surface of the glass sheet to lift the glass sheet G onto the mold. At the same time, vacuum is applied by the mold 14 to hold the glass sheet G against the mold and preform the glass sheet. The arrangement of the air flotation conveyor 12, mold 14, positioners 16 and array of lift jets 18, eliminates the possibility of the glass sheet G being damaged as it is received from the air flotation conveyor onto the mold.

With the glass sheet G held against the mold 14, the mold is raised and the positioner 16 is moved upstream to engage a subsequent glass sheet.

With reference to FIG. 3, a glass sheet processing ring 26, herein illustrated as a combination press-quench ring, is transversely movable relative to the air flotation conveyor 12 between positions wherein the ring is beneath mold 14 and out to the side of the mold to side exit. The press-quench ring 26 is used for press forming the glass sheet G between the mold 14 and ring followed by subsequent quenching on the ring. Alternatively, ring 26 is a press ring, wherein the mold 14 is moved relative to the ring to press form the perimeter of the glass sheet G between the ring and mold. Ring 26 can also be a quench ring and the glass sheet G can be formed by releasing vacuum pressure in the mold 14 such that the glass sheet is released from the mold and then sags to the required shape on the quench ring.

With further reference to FIG. 3 and in the case of forming by pressing, the vacuum drawn by mold 14 is discontinued after the press forming, the vacuum mold is raised, and the glass sheet G is caused to be transferred to the ring 26 for subsequent processing. Ring 26 and the glass sheet G are then moved to the position out to the side of the mold 14 and outside of the glass sheet furnace.

A method for positioning a heated glass sheet in the glass sheet forming system described includes the steps of conveying the glass sheet on a cushion of air, peripherally engaging the floating glass sheet, locating the engaged floating glass sheet beneath the vacuum mold 14, applying jets of lifting air to lift the floating glass sheet upwardly onto the vacuum mold, and applying vacuum to engage the positioned glass sheet on the vacuum mold.

Subsequently the glass sheet G is press bent between mold 14 and press or quench-press ring 26 as the vacuum mold, with the glass sheet thereon, is lowered until the perimeter of the glass sheet is press bent by the ring against the vacuum mold. Alternatively, the vacuum of vacuum mold 14 can be discontinued to release the glass sheet G onto the quench ring 26 to shape the glass sheet under the force of gravity.

While the best mode for carrying out the invention has been described in detail, those familiar with the art to which this invention relates will recognize various alternative designs and embodiments for practicing the invention as defined by the following claims.

What is claimed is:

1. Apparatus for positioning a heated glass sheet for forming comprising:
   a longitudinally extending air flotation conveyor for receiving and floating the heated glass sheet in a plane of conveyance on a cushion of air;
   a glass sheet vacuum mold mounted above the air flotation conveyor for receiving the heated glass sheet;
   a glass sheet positioner mounted relative to the mold and including an actuator for moving the positioner to engage and laterally and longitudinally position the glass sheet with respect to the mold; and
   an array of lift jets located beneath the mold and below the plane of conveyance and interspersed amongst the air floatation conveyor and being operable for lifting the glass sheet through the application of lifting air to the mold.

2. Apparatus as in claim 1 further including a roller conveyor mounted adjacent and upstream of said air flotation conveyor for transporting and imparting movement to the heated glass sheet.

3. Apparatus as in claim 1 further including an air float conveyor mounted adjacent and upstream of said air floatation conveyor on which the glass sheet is moved.

4. Apparatus as in claim 1 further including a glass sheet processing ring for receiving the glass sheet from the mold.

5. Apparatus as in claim 1 wherein said air floatation conveyor is comprised of a plurality of spaced air supply tubes.

6. Apparatus as in claim 5 wherein said lift jet array includes blowing nozzles located between said tubes.

7. Apparatus as in claim 5 wherein said spaced tubes extend laterally relative to said longitudinally extending air flotation conveyor.

8. Apparatus for positioning at least two heated glass sheets simultaneously for forming, the apparatus comprising:

a longitudinally extending air flotation conveyor for receiving and floating consecutive heated glass sheets in a plane of conveyance on a cushion of air;

at least two glass sheet vacuum molds mounted longitudinally relative to and above said air flotation conveyor for receiving consecutive heated glass sheets;

at least two glass sheet positioners, each being mounted relative to one of said respective glass sheet vacuum molds and each including an actuator for moving the positioner to engage and laterally and longitudinally position a glass sheet with respect to one of said respective glass sheet molds, each glass sheet positioner being simultaneously operable for the simultaneous positioning of at least two consecutive glass sheets; and an array of lift jets located beneath said molds and below the plane of conveyance and interspersed amongst said air flotation conveyor for lifting the glass sheets to said molds through the application of lifting air onto the bottom surface of each glass sheet.

9. Apparatus as in claim 8 further including a roller conveyor mounted adjacent and upstream of said air flotation conveyor for conveying the heated glass sheets.

10. Apparatus as in claim 8 further including an air float conveyor mounted adjacent and upstream of said air floatation conveyor for conveying the glass sheets.

11. A method for positioning a heated glass sheet for forming comprising the steps of:

conveying the glass sheet on a cushion of air;

engaging the conveyed glass sheet at a plurality of points about the periphery of the glass sheet;

locating the engaged, conveyed glass sheet beneath a vacuum mold;

applying jets of lifting air to lift the located glass sheet upwardly to the vacuum mold; and applying vacuum to engage the glass sheet with the vacuum mold.

12. The method of claim 11 wherein the positioning is done simultaneously to a plurality of glass sheets.

* * * * *